United States Patent Office 3,531,462
Patented Sept. 29, 1970

3,531,462
**CARBONATES OF CARDENOLIDE TRI-
DIGITOXOSIDES AND ESTER DERIV-
ATIVES THEREOF**
Daisuke Satoh, Nishinomiya-shi, and Tetuo Minesita,
Suita-shi, Japan, assignors to Shionogi & Co., Ltd.,
Osaka, Japan
No Drawing. Filed May 13, 1968, Ser. No. 728,845
Claims priority, application Japan, May 19, 1967,
42/31,877; May 29, 1967, 42/34,095; June 20,
1967, 42/39,488, 42/39,489
Int. Cl. C07c 173/00
U.S. Cl. 260—210.5                                45 Claims

ABSTRACT OF THE DISCLOSURE

Carbonates of cardenolide tridigitoxosides or ester derivatives thereof, a pharmaceutical preparation containing the compounds of the present invention, and a process for preparing them by reacting a carbonating agent with a cardenolide tridigitoxoside or ester derivative thereof said carbonates being useful as cardiotonic agents.

---

The present invention relates to a carbonic acid ester derivative of a cardenolide tridigitoxoside, a pharmaceutical preparation for human and veterinary use, containing the compound of the present invention as an active ingredient and a process for preparing the compounds of the present invention.

Especially, it relates to a carbonic acid ester derivative of a cardenolide tridigitoxoside represented by the general formula:

A carbonic acid ester derivative of

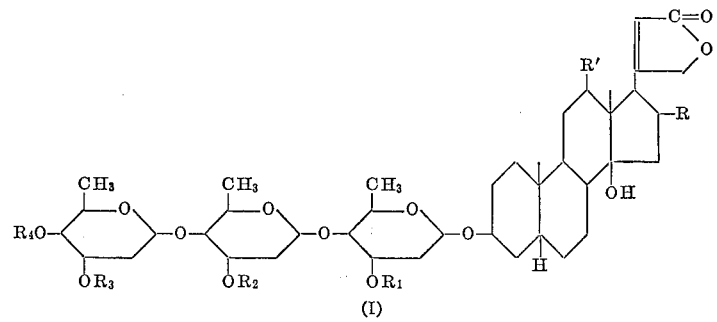

wherein R represents a hydrogen atom or $OR_5$; R' represents a hydrogen atom or $OR_6$; $R_1$, $R_2$, $R_3$, $R_4$, $R_5$ and $R_6$ each represents a hydrogen atom or an acyl group, in which at least one acylable hydroxyl group is present in the molecule.

An object of the present invention is to provide a carbonic acid ester derivatives of a cardenolide tridigitoxoside represented by general Formula I. Another object of the present invention is to provide pharmacologically active substances. Further object of the present invention is to provide useful medicaments for human and veterinary use. Furthermore, the present invention provides a process for preparing useful compounds of the present invention. These and other objects will be realized by the invention as hereinafter disclosed.

The compounds of the present invention is a carbonic acid ester derivative of a cardenolide tridigitoxoside of the general Formula I.

The carbonates are the esters of an acid selected from the formal carbonic acid, represented by the formula:

R″OCOOH                (II)

and

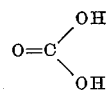  (III)

wherein R″ represents a lower hydrocarbon group containing up to 8 carbon atoms such as an aliphatic hydrocarbon group, a monocyclic aromatic hydrocarbon group or a monocyclic aralkyl hydrocarbon group containing up to 8 carbon atoms, optionally substituted by an inert group. The hydroxyl group esterified with these formal carbonic acids locates at positions 12, 16, 3′, 3″, 3‴, 4‴ and/or other positions.

The aliphatic hydrocarbon group of R″ contains up to 8 carbon atoms and involves alkyl groups and alkenyl groups. These groups may be exemplified by methyl, ethyl, propyl, isopropyl, butyl, isobutyl, tert-butyl, pentyl, isopentyl, hexyl, 2-methylhexyl, octyl groups, cyclohexyl, cyclopentyl, vinyl, allyl groups and the like; the aromatic hydrocarbon group of R″ involves optionally substituted monocyclic aromatic hydrocarbon groups containing up to 8 carbon atoms, e.g. phenyl, nitrophenyl, chlorophenyl, bromophenyl, tolyl, xylyl groups and the like; the aralkyl group of R″ involves optionally substituted monocyclic aralkyl hydrocarbon groups containing up to 8 carbon atoms e.g. benzyl, chlorobenzyl, methylbenzyl, nitrobenzyl, alkoxybenzyl groups and the like.

As for the cardenolide tridigitoxoside part of the compounds of the present invention, digitoxin, digoxin, gitoxin, diginatin, mono- or poly-O-acyl-digitoxin, mono- or poly-O-acyl-digoxin, mono- or poly-O-acylgitoxin, mono- or poly-O-acyl-diginatin and the like, provided that at least one acylable hydroxyl group is present in the molecule, may be cited. In these examples, acyl group includes those derived from carbonic acyl group represented by the Formulae II or III, a hydrocarboncarboxylic acyl group containing up to 10 carbon atoms such as acetyl, propionyl, butyryl, valeryl, capryl, enanthoyl, decanoyl, crotonyl, methacryl, benzoyl, cyclohexanecarbonyl, cyclopentanepropionyl, phenoxyacetyl, alkoxyacetyl, succinyl, hemisuccinyl, monocitryl, hemimalonyl, or the like and an optionally substituted monocyclic aromatic sulfonyl group or a lower alkyl sulfonyl group containing up to 8 carbon atoms such as p-toluenesulfonyl, methanesulfonyl, phenylsulfonyl, nitrobenzenesulfonyl, halobenzenesulfonyl or the like, and an inorganic acyl group such as phosphoryl, sulfuryl, carbonate containing up to 8 carbon atoms including cyclocarbonate, or the like.

The formal carbonic acid represented by the Formula II may be linked at positions 12, 16, 3′, 3″, 3‴ and/or 4‴. The formal carbonic acid represented by the Formula III may be linked at positions 3‴ and 4‴, 12 and 14 and/or 14 and 16, to form cyclic carbonate. One to six carbonic acid residues cited above may be linked to a glycoside.

A specific example of the art of conjugation of these carbonic acids and the glycosides is represented by the formulae:

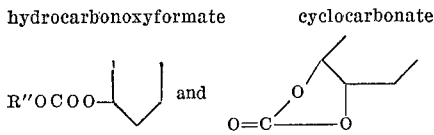

A part of the compounds of the present invention is given below in which the carbonate group is regarded as the derivative of hydroxyformate in the nomenclature, as this is the most simple expression of the unsymmetrical ester of the dibasic inorganic acid:

digitoxin-3''', 4'''-cyclocarbonate,
gitoxin-3''', 4'''-cyclocarbonate,
gitoxin-14,16-cyclocarbonate,
gitoxin-3''', 4''', 14,16-dicyclocarbonate,
digoxin-3''', 4'''-cyclocarbonate,
gitaloxin-3''', 4'''-cyclocarbonate,
diginatin-3''', 4'''-cyclocarbonate,
diginatin-14,16-cyclocarbonate,
digitoxin-3'-methoxyformate,
digitoxin-3''-ethoxyformate,
digitoxin-3'''-methoxyformate,
digitoxin-3'''-ethoxyformate,
digitoxin-3'''-propoxyformate,
digitoxin-3'''-pentyloxyformate,
digitoxin-3'''-octyloxyformate,
digitoxin-3'''-benzyloxyformate,
digitoxin-4'''-methoxyformate,
digitoxin-4'''-ethoxyformate,
digitoxin-4'''-butoxyformate,
digitoxin-4'''-hexyloxyformate,
digitoxin-4'''-cyclohexyloxyformate,
digitoxin-4'''-phenoxyformate,
α-acetyldigitoxin-alkoxyformate,
β-acetylidigitoxin-alkoxyformate,
digitoxin-trialkoxyformate,
16-O-formylgitoxin-3''', 4'''-cyclocarbonate, (gitaloxin-3''', 4'''-cyclocarbonate),
16-O-acetylgitoxin-3''', 4'''-cyclocarbonate,
16-O-propionylgitoxin-3''', 4'''-cyclocarbonate,
16-O-butyrylgitoxin-3''', 4'''-cyclocarbonate,
16-O-valerylgitoxin-3''', 4'''-cyclocarbonate,
16-O-enanthoylgitoxin-3''', 4'''-cyclocarbonate,
16-O-decanoylgitoxin-3''', 4'''-cyclocarbonate,
16-O-benzoylgitoxin-3''', 4'''-cyclocarbonate,
16-O-tosylgitoxin-3''', 4'''-cyclocarbonate,
16-O-hemisuccinylgitoxin-3''', 4'''-cyclocarbonate,
16-O-methoxyformylgitoxin-3''',4'''-cyclocarbonate,
16-O-ethoxyformylgitoxin-3''', 4'''-cyclocarbonate,
16-O-benzyloxyformylgitoxin-3''', 4'''-cyclocarbonate,
16-O-phenoxyformylgitoxin-3''', 4'''-cyclocarbonate,
3'-O-alkoxyformylgitoxin-3''', 4'''-cyclocarbonate,
3''-O-alkoxyformylgitoxin-3''', 4'''-cyclocarbonate,
3'-O-acetylgitoxin-3''', 4'''-cyclocarbonate,
3',3'',16-tri-O-alkanoylgitoxin-3''', 4'''-cyclocarbonate,
16-O-phosphorylgitoxin-3''', 4'''-cyclocarbonate,
16-O-morpholinophosphonylgitoxin-3''', 4'''-cyclocarbonate,
gitoxin-3'''-methoxyformate,
gitoxin-3'-methoxyformate,
gitoxin-3'''-ethoxyformate,
gitoxin-3'''-propoxyformate,
gitoxin-3'''-pentyloxyformate,
gitoxin-3'''-octyloxyformate,
gitoxin-3'''-benzyloxyformate,
gitoxin-4'''-methoxyformate,
gitoxin-4'''-ethoxyformate,
gitoxin-4'''-propoxyformate,
gitoxin-4'''-butoxyformate,
gitoxin-4'''-cyclohexyloxyformate,
gitoxin-4'''-phenoxyformate,
gitoxin-16-methoxyformate,
gitoxin-16-ethoxyformate,
gitoxin-16-propoxyformate,
gitoxin-16-butoxyformate,
gitoxin-16-cyclopentyloxyformate,
gitoxin-16-benzyloxyformate,
16-O-acetylgitoxin-4'''-methoxyformate,
16-O-propionylgitoxin-3'''-methoxyformate,
16-O-propionylgitoxin-4'''-ethoxyformate,
16-O-benzoylgitoxin-4'''-methoxyformate,
16-O-benzoylgitoxin-3'''-propoxyformate,
16-O-tosylgitoxin-3'''-ethoxyformate,
16-O-hemisuccinylgitoxin-4'''-methoxyformate,
α-acetylgitoxin-16-ethoxyformate,
β-acetylgitoxin-16-methoxyformate,
α-acetylgitoxin-16-phenoxyformate,
β-acetylgitoxin-16-cyclohexyloxyformate,
gitoxin-3''', 16-di-methoxyformate,
gitoxin-3''', 16-diethoxyformate,
gitoxin-3''', 16-di-propoxyformate,
gitoxin-3''', 16-di-phenoxyformate,
3'''-O-methoxyformylgitoxin-16-butoxyformate,
gitoxin-4''', 16-dimethoxyformate,
gitoxin-4''', 16-di-ethoxyformate,
gitoxin-4''', 16-di-propoxyformate,
gitoxin-4''', 16-di-pentyloxyformate,
4'''-O-ethoxyformylgitoxin-16-cyclopentyloxyformate,
gitoxin-3''', 3'' or 3'-di-ethoxyformate,
gitoxin-3''', 4'''-di-methoxyformate,
gitoxin-3''', 4'''-di-ethoxyformate,
gitoxin-3''', 4'''-di-butoxyformate,
gitoxin-3' or 3'', 4'''-di-methoxyformate,
gitoxin-3' or 3'', 4'''-di-ethoxyformate,
16-O-formylgitoxin-3''', 3''-dimethoxyformate,
16-O-formylgitoxin-4''', 3'' or 3'-diethoxyformate,
16-O-acetylgitoxin-3' or 3'', 3'''-dimethoxyformate,
16-O-acetylgitoxin-3' or 3'', 4'''-diethoxyformate,
16-O-acetylgitoxin-3' or 3'', 4'''-dipropoxyformate,
16-O-acetylgitoxin-3''', 4'''-di-ethoxyformate,
16-O-propionylgitoxin-3' or 3'', 4'''-dimethoxyformate,
16-O-propionylgitoxin-3''', 4'''-di-ethoxyformate,
16-O-valerylgitoxin-3''', 4'''-dipropoxyformate,
16-O-benzoylgitoxin-3''', 4'''-dimethoxyformate,
16-O-tosylgitoxin-4''', 3''-di-ethoxyformate,
16-O-hemisuccinylgitoxin-3''', 4'''-diethoxyformate,
gitoxin-3''', 4''',16-tri-methoxyformate,
gitoxin-3' or 3'', 3''', 16-tri-ethoxyformate,
gitoxin-3''', 4'''-3' or 3''-tetraethoxyformate,
16-O-acetylgitoxin-3''',4''',3'' or 3'-triethoxyformate,
16-O-ocetylgitoxin-3''',4''',3'',3'-tetramethoxyformate,
gitoxin pentamethoxyformate,
gitoxin pentaethoxyformate,
12-O-acetyldigoxin-3''', 4'''-cyclocarbonate,
12-O-propionlydigoxin-3''', 4'''-cyclocarbonate,
12-O-butyryldigoxin-3''', 4'''-cyclocarbonate,
12-O-valeryldigoxin-3''', 4'''-cyclocarbonate,
12-O-enanthoyldigoxin-3''', 4'''-cyclocarbonate,
12-O-decanoyldigoxin-3''', 4'''-cyclocarbonate,
12-O-benzoyldigoxin-3''', 4'''-cyclocarbonate,
12-O-tosyldigoxin-3''', 4'''-cyclocarbonate,
12-O-hemimalonyldigoxin-3''', 4'''-cyclocarbonate,
12-O-glysyldigoxin-3''',4'''-cyclocarbonate,
12-O-methoxyformyldigoxin-3''', 4'''-cyclocarbonate,
12-O-ethoxyformyldigoxin-3''', 4'''-cyclocarbonate,
12-O-pentyloxyformyldigoxin-3''', 4'''-cyclocarbonate,
12-O-benzyloxyformyldigoxin-3''', 4'''-cyclocarbonate,
3' or 3'', 12-di-lower alkoxyformyldigoxin-3''', 4'''-cyclocarbonate,
12-O-benzoyldigoxin-3' or 3''-ethoxyformate-3''', 4'''-cyclocarbonate,
digoxin-3'-pentyloxyformate,
digoxin-3''-isobutoxyformate,
digoxin-3'''-methoxyformate,
digoxin-3'''-ethoxyformate, digoxin-3'''-nonyloxyformate,
digoxin-3'''-benzyloxyformate,
digoxin-4'''-methoxyformate,
digoxin-4'''-ethoxyformate,
digoxin-4'''-propoxyformate,
digoxin-4'''-butoxyformate,
digoxin-4'''-hexyloxyformate,
digoxin-4'''-phenoxyformate,
digoxin-12-methoxyformate,
digoxin-12-ethoxyformate,
digoxin-12-phenoxyformate,
12-O-acetyldigoxin-4'''-methoxyformate,
12-O-propionyldigoxin-3'''-ethoxyformate,
12-O-propionyldigoxin-4'''-methoxyformate,
12-O-benzyldigoxin-3'''-ethoxyformate,
12-O-benzoyldigoxin-4'''-methoxyformate,
12-O-tosyldigoxin-3'''-ethoxyformate,
12-O-hemisuccinyldigoxin-4'''-ethoxyformate,
α-acetyldigoxin-12-ethoxyformate,
β-acetyldigoxin-12-cyclopentylformate,
digoxin-3''', 12-dimethoxyformate,
digoxin-3''', 12-diethoxyformate,
digoxin-3''', 12-dibenzyloxyformate,
digoxin-4''', 12-di-methoxyformate,
digoxin-4''', 12-diethoxyformate,
digoxin-4''', 12-dibutoxyformate,
digoxin-4''', 12-di-cyclopentyloxyformate,
digoxin-3''', 3'' or 3'-di-ethoxyformate,
digoxin-3''', 4'''-dimethoxyformate,
digoxin-3''', 4'''-di-ethoxyformate,
digoxin-3''', 4'''-dibutoxyformate,
digoxin-3' or 3'', 4'''-di-ethoxyformate,
12-O-formyldigoxin-4''', 3'''-dimethoxyformate,
12-O-acetyldigoxin-3' or 3'', 4'''-di-ethoxyformate,
12-O-propionyldigoxin-3' or 3'', 4'''-dimethoxyformate,
12-O-enanthoyldigoxin-3' or 3'', 4'''-di-propoxyformate,
12-O-benzenesulfonyldigoxin-3' or 3'', 3'''-di-ethoxyformate,
12-O-hemiadipinyldigoxin-3''', 4'''-dibenzyloxyformate,
digoxin13''', 4''', 12-trimethoxyformate,
digoxin-3'', 3''', 12-triethoxyformate,
digoxin-3''', 4''', 3'' or 3', 12-tetraethoxyformate,
digoxin pentamethoxyformate,
digoxin pentaethoxyformate,
diginatin-3'', 4'''-cyclocarbonate,
diginatin-3''' or 4'''-alkoxyformate,
diginatin-trialykoxyformate,
diginatin-tetraalkoxyformate,
16-O-alkoxyformyldiginatin-3''', 4'''-cyclocarbonate,
12-O-alkanoyldiginatin-3''' or 4'''-alkoxyformate,
12,16-di-alkanoyldiginatin-3''', 4'''-cyclocarbonate,
12,16-di-alkanoyldiginatin-3''', 4'''-dialkoxyformate,
diginatin-hexa-alkoxyformate, and the like.

These compounds reveal useful cardiotonic activities For example, they show bradicardia, increase of tonus, heart arrest, retardation of heart rate, heart fibrillation, appearance of characteristic feature in electrocardiograms, and related activities, at a concentration of $10^{-5}$–$10^{-8}$ mole per liter, to isolated guinea pig heart muscle or cat. Those of gitoxin-3''', 4'''-cyclocarbonate, gitoxin-trimethoxyformate, gitoxin-tetraethoxyformate, gitoxin-3''', 4'''-cyclocarbonate, gitoxin-4'''-cathylate, gitoxin-3,''', 4''', 16-tricathylate, gitoxin-16-cathylate, digitoxin-3''', 4'''-cyclocarbonate, digitoxin-triethoxyformate, digitoxin-tetraethoxyformate, digitoxin-4'''-cathylate, digitoxin-tricathylate, digoxin-3''', 4'''-cyclocarbonate, digoxin-12-cathylate, digoxin - triethoxyformate, 12-O-methoxyformyldigoxin-3''', 4''' - cyclocarbonate, 12-O-benzoyldigoxin-3''', 4'''-cyclocarbonate, and the like showed a characteristic cardiotonic response of the order of that of digitoxin, the best digitalizing medicine. These activities usually decrease according to increase in number of acyl groups linked to the molecule.

These activities show the compounds of the present invention is useful for its pharmacological activities. For example they are utilized for treatment of heart diseases, such as congestive heart caused from heart failure such as valvular affection, hypertension, arterioscleosis, myocardial infarction, and the like, or edema, anasarca, seroperitoneum, hydrothorax, dyspnea and the like caused by heart failure or arrhythmia such as auricular fibrillation, absolute arrhythmia, extrasystoles, tachycardia, auricular flutter, or the like or acute heart failure, acute congestive heart, acute heart hyposthenia, tonus disorder or the like, or so called digitalization or saturation in normal or acute cases in a daily dosis of 0.1 γ/kg. to 100 mg./kg. for human and veterinary use. The content of the compound in drugs are preferably uniform to make a unit dose tablet, pills, capsules or the like or injections, to make a medicine utilized for maintenance dosis or saturation or digitalization.

Moreover, they have increased solubility in various solvents. particularly, the abundantly existing glycosides of gitoxin are not used as practical medicaments because of their insolubility in many solvents, including water and alcohols; this despite the strong cardiotonic activity often observed when the glycosides are dissolved in peculiar solvents unsuitable for medical use. Almost of the cardiac activity of leaf extract once assumed to be the action of gitoxin was confirmed to belong largely to gitaloxin, gitoxigenin-di-digitoxoside and gitoxigenin-monodigitoxoside. The compounds of this invention is prepared easily from abundant materials in moderately high yield. Especially, 3''', 4'''-cyclocarbonates of the present invention may be obtained in a uniform state in high yield by commonly used reagents in a very mild reaction condition. They are also useful in the synthesis of the other valuable cardiac glycosides or derivatives thereof.

The compounds of the present invention may be utilized in a wide variety of oral or parenteral dosage forms, solely or in admixture wtih co-acting agents. They may be administered in a solid composition such as tablets, capsules, pills, if required in a unit dosage form, powders, granules, or the like or in liquid compositions such as injections, ointments, suspensions, solutions, emulsions, syrups, elixirs, oils or the like. They may be flavored, colored and tablets, granules or pills may be coated. The preparation are prepared by conventional methods in conjunction with a solid or liquid pharmaceutical excipient. Suitable excipients include water, vegetable oils such as cacao oil, olive oil, peanut oil, sesame oil, etc., glycerin, glycols, esters of lower alcohols with fatty acids, fatty acids, isopropyl myristate, benzyl alcohol, polyethyleneglycols, gelatine, sucrose, glucose, lactose, starches, sodium alginate, magnesium stearate, talc, kaolin, bentonite, boric acid, calcium carbonate, sodium chloride, sodium benzoate, vaselin, paraffin, acacia, tragacanth, agar, fats, lard, wool fat, resins, coloring agents flavoring substances, emulsifying agents, solubilizing agent, buffers, stabilizers, disinfectants, and the like.

The process of the present invention comprises reacting a cardenolide tridigitoxoside with a carbonating agent to obtain the objective compounds of the present invention.

The preferred cardenolide tridigitoxosides of the present invention involves digitoxin, gitoxin, digoxin, diginatin, gitaloxin, gitoxin-16-acylates, digoxin-12-acylates, diginatin-12-acylates, diginatin-16-acylates, diginatin-12,16-diacylates, digitoxin, gitoxin, digoxin or diginatin acylates in which acyl group is linked at sugar moiety of the molecule, and the like, provided that at least one acylable hydroxyl group is present in the molecule, wherein acyl group may be lower hydrocarbon-oxyformyl group, hydrocarboncarboxylic acyl group, hydrocarbonsulfonyl group, partial ester of polybasic carboxylic acyl group, ester of inorganic acyl group and the like, and lower alkyl group may be methyl, ethyl, propyl, isopropyl, butyl, isobutyl, tert-butyl, hexyl, octyl and the like containing up to eight carbon atoms.

The preferred carbonating agent of the present invention involves a carbonating agent of the general formula:

COXY     (IV)

wherein X represents a halogen atom, a lower alkoxy group, an aralkyloxy group or an aryloxy group; Y represents a halogen atom, a lower alkoxy group aralkyloxy group, an aryloxy group or —OCOX group.

As for the carbonating agent represented by the general Formula IV, there is exemplified by a carbonyl halogenide, such as phosgene, carbonyl bromide or carbonyl bromide chloride, a carbonic acid ester such as dimethyl carbonate, diethyl carbonate, di-isopropyl carbonate, propyl carbonate, methyl butyl carbonate, ethyl p-nitrophenyl carbonate, methyl nitrophenyl carbonate, benzyl nitrophenyl carbonate, ethyl cyclohexyl carbonate, or propyl allyl carbonate, a pyrocarbonate such as dimethyl pyrocarbonate, diethyl pyrocarbonate, dipropyl pyrocarbonate, dibutyl pyrocarbonate, dioctyl pyrocarbonate, methyl propyl pyrocarbonate, ethyl octyl pyrocarbonate, methyl vinyl pyrocarbonate, methyl benzyl pyrocarbonate or diphenyl pyrocarbonate, a haloformate such as methyl chloroformate, ethyl chloroformate, propyl chloroformate, isopropyl chloroformate, tert-butyl chloroformate, amyl chloroformate, octyl chloroformate, cyclopentyl chloroformate, cyclohexyl chloroformate, benzyl chloroformate, phenyl chloroformate, methyl bromoformate, ethyl bromoformate, or benzyl bromoformate, a thiocyanatoformate, phosphonoformate and a carbamate and other carbonating agents.

These compounds react with the reagents by mere contact at a temperature from —80° C. to 200° C. The reaction may be carried out in the presence of an inert solvent, for example a hydrocarbon such as ligroin, petroleum ether, petroleum benzine, pentane, hexane, heptane, benzene, toluene, xylene or naphthalene, an ether such as diethyl ether, dimethyl ether, tetrahydrofuran or dioxane, a ketone, such as acetone, methyl ethyl ketone, an ester such as ethyl acetate or butyl acetate, a halogenated hydrocarbon such as chloroform, methylene, chloride, ethyl chloride, dichloroethane, and other solvents such as carbon disulfide, dimethylformamide, pyridine, collidine, quinoline, ethylamine, diethylamine, dimethylsulfoxide, or a tertiary or secondary alcohols or mixture thereof. Sometimes, an organic base plays a role of catalyst in the reaction.

The amount of reagent is selected so as to obtain the best results and generally 1 to 500 mole equivalents is reacted with the starting material. Occasionally decomposition of the reagent is observed and large amount of the reagent is required. However, in some cases, one to ten mole equivalents is satisfactory for complete reaction.

Preferred reaction temperature is selected from a temperature of range from —80° C. to boiling point of the solvent used. As almost of the reaction of this invention is partial reaction, the temperature and the reaction time is selected so as to obtain the best results according to the nature, sort, concentration of the starting material, reagent and solvent used.

Some of the reagents eliminate gases or alcohols during the reaction. These products may be removed by heating the reaction system. Some of the reagents liberate acid during the reaction. These reactions are promoted by addition of an organic base such as pyridine, collidine, triethylamine, etc., or an inorganic base such as sodium carbonate, potassium carbonate, lithium carbonate, sodium hydrogen carbonate, potassium hydrogen carbonate, calcium carbonate, calcium hydroxide, potassium hydroxide, sodium acetate and the like.

The process of the present invention also involves transformation of the product namely 3′′′ or 4′′′-carbonate into 3′′′,4′′′-cyclic carbonate by action of acid or base. The reaction is illustrated by reaction schema:

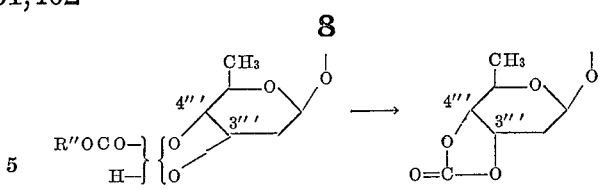

wherein R″ represents a hydrocarbon group cited in explanation of compound II. As for an acid, there is exemplified an organic acid such as acetic acid, propionic acid, butyric acids, valeric acids, oxalic acid, succinic acid, benzoic acid, toluenesulfonic acids, ethanesulfonic acid, trichloroacetic acid, silica gel and the like, and inorganic acid such as hydrochloric acid, sulfuric acid, nitric acid, silica gel, Lewis acids and the like. As for the base, there is exemplified alkali metal hydroxides, alkali metal hydrogen carbonates, alkali earth hydroxide, alkali earth carbonates, alkali metal acetates, pyridine, collidine, quinoline, trialkylamines, ammonia, dialkylamine and the like.

The reaction may be carried out with or without presence of an inert solvent at a temperature of range between —15° C. to reflux temperature of the solvent used. The inert solvent include a hydrocarbon such as ligroin, pentane, hexane, heptane, benzene, toluene or petroleum ether, an ether such as diethyl ether, dimethyl ether, tetrahydrofuran or dioxane, a ketone, such as acetone, methyl ethyl ketone, an ester such as ethyl acetate, or butyl acetate, a halogenated hydrocarbon such as chloroform, methylene chloride, and other solvents such as carbon disulfide, dimethylformamide, pyridine, collidine, alkylamines, dimethylsulfoxide or an alcohol such as methanol, ethanol, butanols, and mixture thereof, in some cases in a mixture with water.

The products of the process of the present invention may be isolated by a conventional manner from the reaction mixture. For example, concentration, dilution with an insoluble solvent, filtration, extraction with an immiscible solvent, washing, drying, evaporation of solvent, etc. The products thus obtained may be purified by a conventional method such as recrystallization, chromatography, treatment with adsorbent and related methods.

The following examples are given by way of illustration only and are not intended as limitation of the scope of the present invention, many apparent variations of which are possible without departing from the spirit and scope of the present invention.

EXAMPLE 1

Into a solution of 500 mg. gitoxin in 15 ml. anhydrous pyridine, there is added dropwise dimethyl pyrocarbonate at 5–10° C. and the mixture is left standing for 30 minutes. The reaction mixture is concentrated under reduced pressure, added with water and extracted with chloroform. The extract is washed with 5% hydrochloric acid, 5% aqueous sodium hydrogen carbonate and water, dried and evaporated to obtain 551 mg. residue. Separation of the residue by thin layer chromatography affords following six substances:

(1) Gitoxin: 52 mg. (starting material)
(2) Gitoxin-16-methoxyformate: 57 mg., M.P. 219–224° C. (decomp.), $[\alpha]_D^{22}$ +1.8±0.7° (c.=0.541, methanol).

*Analysis.*—Calcd. for $C_{43}H_{66}O_{16}$ (percent): C, 61.56; H, 7.93; $CH_3O$, 3.70. Found (percent): C, 61.29; H, 8.40; $CH_3O$, 3.67.

(3) Gitoxin-4′′′-methoxyformate: 75 mg., M.P. 228–232° C. (decomp.), $[\alpha]_D^{21}$ +26.9° (c.=1.054, methanol), UV: $\lambda_{max.}^{EtOH}$ 219 m$\mu$ ($\epsilon$ 15190)

*Analysis.*—Calcd. for $C_{43}H_{66}O_{16} \cdot H_2O$ (percent): C, 60.26; H, 8.00; $CH_3O$, 3.51. Found (percent). C, 60.47; H, 7.87; $CH_3O$, 3.37.

(4) Gitoxin-3′′′,4′′′-cyclocarbonate: 40 mg., M.P. 238–240° C.

(5) 16 - O-methoxyformylgitoxin-3''',4'''-cyclocarbonate: 35 mg., M.P. 158–162° C. (decomp.), $[\alpha]_D^{23}$+6.3° (c.=0.937, chloroform).

*Analysis.*—Calcd. for $C_{44}H_{64}O_{17} \cdot H_2O$ (percent): C, 59.85; H, 7.53; $CH_3O$, 3.51. Found (percent): C, 59.53; H, 7.64; $CH_3O$, 3.97.

(6) Gitoxin - 3''',4''',16-trimethoxyformate: 69 mg., M.P. 160–165° C.,

UV: $\lambda_{max.}^{EtOH}$ 215 m$\mu$ ($\epsilon$ 13170)

*Analysis.*—Calcd. for $C_{47}H_{70}O_{20}$ (percent): C, 59.10; H, 7.29; $CH_3O$, 9.75. Found (percent): C, 58.56; H, 1.53; $CH_3O$, 9.18.

EXAMPLE 2

Following the procedure described in Example 1, digitoxin and digoxin are reacted with dimethyl pyrocarbonate at 5–10° C. to obtain digitoxin-4''-methoxyformate, digitoxin-3''',4'''-cyclocarbonate and 3' or 3''-O-methoxyformyldigitoxin - 3''',4'-cyclocarbonate, and digoxin - 4'''-methoxyformate, digoxin-12-methylformate, 12 - O-methoxyformyldigoxin-3''',4'''-cyclocarbonate, respectively.

EXAMPLE 3

Into a solution of 600 mg. gitoxin in 13 ml. pyridine, there is added dropwise dimethyl pyrocarbonate under stirring at 70–75° C. and the mixture is kept at the same temperature for 30 minutes. The reaction mixture is concentrated under reduced pressure, and then treated by the method described in Example 1 to obtain 630 mg. residue. Separation of the residue by thin-layer chromatography affords following compounds.

(1) Gitoxin - 3''',4''' - cyclocarbonate: 250 mg., M.P. 238–240° C.

(2) 16 - O - methoxyformylgitoxin - 3''',4'''-cyclocarbonate: 170 mg., M.P. 158–162° C.

(3) Gitoxin - 3''',4''',16 - trimethoxyformate: 58 mg., M.P. 160–165° C.

EXAMPLE 4

Into a solution of 500 mg. gitoxin in 20 ml. anhydrous pyridine, there is added dropwise diethyl pyrocarbonate at room temperature, with stirring. Then the mixture is left standing for 1 hour at room temperature and treated by a similar method as described in Example 1 to obtain 580 mg. residue. Separation of the residue by thin-layer chromatography affords 77 mg. 16-O-ethoxyformylgitoxin-3''',4'''-cyclocarbonate, M.P. 150–156° C. (decomp.), $[\alpha]_D^{23}$+17.7° (c.=0.942, chloroform).

*Analysis.*—Calcd. for $C_{45}H_{66}O_{17}$ (percent): C, 61.49; H, 7.59; $C_2H_5O$, 5.13. Found (percent): C, 60.94; H, 7.53; $C_2H_5O$, 5.66, 110 mg. gitoxin-3''',4''',16-triethoxyformate, M.P. 142–149° C. (decomp.), $[\alpha]_D^{23}$ +15.1° (c.=0.973, pyridine), UV: $\lambda_{max.}^{EtOH}$ 215.5 m$\mu$ ($\epsilon$ 14130)

*Analysis.*—Calcd. for $C_{50}H_{76}O_{20}$ (percent): C, 60.22; H, 7.68; C, $C_2H_5O$, 13.56. Found (percent): C, 60.51; H, 7.71; $C_2H_5O$, 13.07, and 350 mg. gitoxin-3''',4'''-cyclocarbonate, M.P. 235–238° C. (decomp.).

EXAMPLE 5

Following the procedure described in Example 4, digoxin is reacted with diethyl pyrocarbonate at room temperature to obtain 12-O-ethoxyformyldigoxin-3''',4'''-cyclocarbonate, digoxin-3''',4''',12-triethoxyformate and digoxin-3' or 3'', 3''',4''',12-tetraethoxyformate.

EXAMPLE 6

Into a solution of 600 mg. gitoxin in 18 ml. pyridine, there is added dropwise diethyl pyrocarbonate at 70–75° C. and the mixture is kept at the same temperature for 10 minutes. The reaction mixture is added with water and 608 mg. precipitate separated out is collected by filtration. Separation of the precipitate by thin-layer chromatography affords three main products and two byproducts.

(1) Gitoxin - 3''',4''' - cyclocarbonate: M.P. 235–238° C. (decomp.).

(2) 16 - O - ethoxyformylgitoxin - 3''',4''' - cyclocarbonate: 171 mg., M.P. 150–156° C. (decomp.).

(3) gitoxin - 16,4''' - diethoxyformate: M.P. 140–149° C. (decomp.).

$[\alpha]_D^{23}$ +11.9±0.5° (c.=0.662, pyridine), UV: $\lambda_{max.}^{EtOH}$ 216 m$\mu$ ($\epsilon$ 14580)

*Analysis.*—Calcd. for $C_{47}H_{72}O_{18}$ (percent): C, 61.02; H, 7.85; $C_2H_5O$, 9.74. Found (percent): C, 60.87; H, 7.94; $C_2H_5O$, 10.13.

EXAMPLE 7

Into a solution of 580 mg. gitoxin in 70 ml. anhydrous pyridine, there is added dropwise methyl chloroformate with stirring at 0 to —5° C., and the resultant mixture is left standing at room temperature for 2 hours. The reaction mixture is concentrated in vacuo, added with water and extracted with chloroform. The extract is washed with 5% aqueous hydrochloric acid, 5% aqueous sodium hydrogen carbonate and water, dried and evaporated to obtain 650 mg. residue. Recrystallization of the residue from acetone affords 458 mg. gitoxin-4'''-methoxyformate, M.P. 228–232° C. (decomp.), $[\alpha]_D^{21}$ +26.9° (c.=1.054, methanol), UV: $\lambda_{max.}^{EtOH}$ 219 m$\mu$ ($\epsilon$ 15190)

*Analysis.*—Calcd. for $C_{43}H_{66}O_{16} \cdot H_2O$ (percent): C, 60.26; H, 8.00; $OCH_3$, 3.51. Found (percent): C, 60.47; H, 7.87; $OCH_3$, 3.37.

EXAMPLE 8

Into a solution of 500 mg. gitoxin in 40 ml. pyridine, there is added dropwise 1.39 g. ethyl chloroformate with stirring at 0 to —5° C., and the resultant mixture is left standing at room temperature for 20 minutes. The reaction mixture is concentrated in vacuo, added with water and extracted with cholorform. The extract is washed with 5% aqueous hydrochloric acid, 5% aqueous sodium hydrogen carbonate and water, dried and evaporated to obtain 650 mg. residue. Purification of the residue by thin layer chromatography affords following substances.

(1) Gitoxin-4'''-ethoxyformate: 220 mg., M.P. 230–233° C. (decomp.), $[\alpha]_D^{23}$ +22.4±0.7° (c.=0.738, pyridine), UV: $\lambda_{max.}^{EtOH}$ 219.5 m$\mu$ ($\epsilon$ 14250)

*Analysis.*—Calcd. for $C_{44}H_{68}O_{16}$ (percent): C, 61.95; H, 8.04; $OC_2H_5$, 5.29. Found (percent): C, 62.35; H, 8.20; $OC_2H_5$, 5.26.

(2) Gitoxin-16,4'''-diethoxyformate: 165 mg., M.P. 140–149° C.

(3) Gitoxin-triethoxyformate, gitoxin - 3''',4''' - cyclocarbonate and gitoxin-tetraethoxyformate: trace amount.

EXAMPLE 9

Into a solution of 500 mg. gitoxin in 40 ml. pyridine, there is added dropwise ethyl chloroformate and the mixture is kept at 0° C. for two hours. The reaction mixture is worked up as Example 8 to afford:

(1) Gitoxin-3''',4''',16 - triethoxyformate: 165 mg., M.P. 142–149° C. (decomp.), $[\alpha]_D^{23}$ +15.1° (c.=0.973, pyridine), UV:

$\lambda_{max.}^{EtOH}$ 215.5 m$\mu$ ($\epsilon$ 14130)

*Analysis.*—Calcd. for $C_{50}H_{76}O_{20}$ (percent): C, 60.22; H, 7.68; $OC_2H_5$, 13.56. Found (percent): C, 60.51; H, 7.71; $OC_2H_5$, 13.07.

(2) Gitoxin-3' or 3'',3''',4''',16 - tetraethoxyformate: 56 mg., M.P. 132–140° C. (decomp.).

*Analysis.*—Calcd. for $C_{53}H_{80}O_{22}$ (percent): C, 59.53; H, 7.54; $OC_2H_5$, 16.86. Found (percent): C, 59.28; H, 7.44; $OC_2H_5$, 16.88.

EXAMPLE 10

Following the procedure described in Example 9, digitoxin is reacted with ethyl chloroformate at 0° C. to af-

11 ford digitoxin - 4'''-ethoxyformate, digitoxin-3''',4'''''-diethoxyformate and digitoxin-3''',4''',3'' or 3'-triethoxyformate.

EXAMPLE 11

Following the procedure described in Example 9, digoxin is reacted with methyl chloroformate at room temperature to obtain digoxin-4'''-methoxyformate, digoxin-3''',4'''-dimethoxyformate, digoxin-4''',12-dimethoxyformate, digoxin-3' or 3'',3''',4''',12-tetraethoxyformate.

EXAMPLE 12

Into a cooled solution of 500 mg. digitoxin in 15 ml. anhydrous pyridine, there is added 5 ml. solution of phosgene in toluene at −5–0° C., and stirred for 30 minutes at 0° C. The mixture is added with ice water and extracted with chloroform. The chloroform solution is washed with 5% aqueous hydrochloric acid, 3% sodium hydrogen carbonate and water, dried over sodium sulfate and evaporated under reduced pressure to obtain 554 mg. residue. Recrystallization of the residue from acetone affords 360 mg. pure digitoxin-3''',4'''-cyclocarbonate, M.P. 240–243° C. (decomp.), UV: $\lambda_{max.}^{EtOH}$ 218 m$\mu$ ($\epsilon$ 15030), IR:

$\nu_{max.}^{CHCl_3}$ 3550, 1818, 1747, 1623 cm.$^{-1}$

*Analysis.*—Calcd. for $C_{42}H_{62}O_{14}\cdot H_2O$ (percent): C, 62.36; H, 7.98. Found (percent): C, 62.77; H, 8.00.

EXAMPLE 13

Into a cooled solution of 500 mg. digoxin in 15 ml. anhydrous pyridine, there is added 5 ml. solution of phosgene in toluene at −5–0° C., and stirred for 30 minutes at 0° C. The mixture is added with ice water and extracted with aqueous hydrochloric acid, 3% sodium hydrogen carbonate and water, dried over sodium sulfate and evaporated under reduced pressure to obtain 530 mg. residue. Purification of the residue by thin-layer chromatography affords 360 mg. digoxin-3''',4'''-cyclocarbonate, M.P. 268–270° C. (decomp.), $[\alpha]_D^{24}$ +9.0±0.5° (c.=0.986, chloroform), UV: $\lambda_{max.}^{EtOH}$ 219 m$\mu$ ($\epsilon$ 14970), IR: $\nu_{max.}^{CHCl_3}$ 3540, 1815, 1744, 1625 cm.$^{-1}$

*Analysis.*—Calcd. for $C_{42}H_{62}O_{15}$ (percent): C, 62.51; H, 7.75. Found (percent): C, 62.35; H, 7.88.

EXAMPLE 14

Into a cooled solution of 500 mg. gitoxin in 50 ml. anhydrous pyridine, there is added 6 ml. solution of phosgene in toluene at −10° C. and left standing at room temperature for 90 minutes. The mixture is added with ice and extracted with chloroform. The chloroform extract is washed with 5% aqueous hydrochloric acid, 5% aqueous sodium hydrogen carbonate and water, dried over sodium sulfate and evaporated under reduced pressure to obtain 530 mg. residue. Purification of residue by chromatography over silica gel and recrystallizaation of the main fraction from acetone affords 320 mg. pure gitoxin-3''',4'''-cyclocarbonate, M.P. 238–240° C. (decomp.).

$[\alpha]_D^{22}$+21.6° (c=0.518, chloroform), UV: $\lambda_{max.}^{EtOH}$ 218 m$\mu$ ($\epsilon$ 14590), IR: $\nu_{max.}^{CHCl_3}$ 3460, 1809, 1747, 1628, 1616 cm.$^{-1}$

*Analysis.*—Calcd. for $C_{42}H_{62}O_{15}$ (percent): C, 62.51; H, 7.75. Found (percent): C, 62.33; H, 7.97.

EXAMPLE 15

Following the procedure described in Example 14, 100 mg. gitoxin is reacted with 250 mg. carbonyl bromide to obtain 72 mg. gitoxin-3''',4'''-cyclocarbonate, M.P. 235–238° C.

EXAMPLE 16

Following the procedure described in Example 14, diginatin is reacted with phosgene to give diginatin-3''', 4'''-cyclocarbonate.

EXAMPLE 17

Following the procedure described in Example 14, gitoxin - 16-formate, gitoxin-16-acetate, gitoxin-16-propionate, gitoxin-16-benzoate, gitoxin-16-ethoxyformate, gitoxin - 16-methoxyformate, gitoxin-16-p-toluenesulfonate and gitoxin-16-hemisuccinate are reacted with phosgene to afford 16-O-formylgitoxin-3''',4'''-cyclocarbonate (gitaloxin-3''',4'''-cyclocarbonate), 16-O-acetylgitoxin-3''',4'''-cyclocarbonate M.P. 170–178° C., 16-O-propionylgitoxin-3''',4'''-cyclocarbonate M.P. 172–182° C., 16-O-benzoylgitoxin-3''',4'''-cyclocarbonate M.P. 165–175° C., 16-O-ethoxyformylgitoxin - 3''',4'''-cyclocarbonate, M.P. 150–156° C., 16-O-methoxyformylgitoxin-3''',4''' - cyclocarbonate M.P. 158–162° C., 16-O-p-toluene sulfonylgitoxin-3''',4'''-cyclocarbonate, 16-O - hemisuccinylgitoxin-3''',4'''-cyclocarbonate, respectively.

EXAMPLE 18

Following the procedure described in Example 14, digoxin - 12 - acetate, digoxin-12-propionate, digoxin-12-benzoate, digoxin - 12-p-toluenesulfonate, 12-O-methoxyformyldigoxin and 12-O-ethoxyformyldigoxin are reacted with phosgene to afford 12-O-acetyldigoxin-3''',4'''-cyclocarbonate, 12-O-propionyldigoxin-3''',4'''cyclocarbonate, 12 - O-benzoyldigoxin-3''',4'''-cyclocarbonate, 12-O-toluenesulfonyldigoxin-3''',4'''-cyclocarbonate, 12 - O - methoxyformyldigoxin - 3''',4'''-cyclocarbonate and 12-O-ethoxyformyldigoxin-3''',4'''-cyclocarbonate, respectively.

EXAMPLE 19

Into a solution of 100 mg. gitoxin-3''', 4'''-cyclocarbonate in 5 ml. dioxane there is added dropwise 1 g. diethyl pyrocarbonate at 70–75° C. After the mixture is kept at the same temperature for 2 hours, the solvent and reagent are removed by evaporation under reduced pressure to obtain colorless oil. Recrystallization of the residue from acetone affords 67 mg. 16-ethoxyformylgitoxin-3''', 4'''-cyclocarbonate, M.P. 150–154° C. (decomp.).

EXAMPLE 20

Into a solution of 150 mg. gitoxin-3''',4'''-cyclocarbonate in 4 ml. pyridine, there is added dropwise 0.67 ml. dimethyl pyrocarbonate at 5–10° C. After the mixture is kept at room temperature for 30 minutes, the solvent and the reagent are removed by evaporation under reduced pressure to obtain colorless powder. Recrystallization of the residue from acetone affords 88 mg. 16-methoxyformylgitoxin-3''',4'''-cyclocarbonate, M.P. 158–162° C. (decomp.).

EXAMPLE 21

A suspension of 100 mg. gitoxin in 5 ml. ethyl pyrocarbonate and 0.1 ml. of pyridine is stirred for 36 hours at room temperature. The reaction mixture is filtrated to remove solid material and evaporated to obtain 110 mg. residue. Recrystallization of the residue from acetone affords 60 mg. gitoxin-tetraethoxy formate, M.P. 132–140° C. (decomp.).

EXAMPLE 22

A suspension of 100 mg. gitoxin in 5 ml. ethyl pyrocarbonate and 0.1 ml. of pyridine is added with 10 mg. sodium carbonate and stirred for 5 hours at 100° C. The reaction mixture is filtrated to remove solid material and evaporated to obtain 70 mg. residue. Recrystallization of the residue from acetone affords 38 mg. gitoxin-tetraethoxyformate, M.P. 132–140° C. (decomp.) and 10 mg. gitoxin-triethoxyformate, M.P. 142–149° C. (decomp.).

EXAMPLE 23

A solution of 800 mg. gitoxin-4'''-monomethoxyformate in 160 ml. acetone is added with 200 mg. anhydrous potassium carbonate and refluxed for 2 hours. The mixture is filtered to remove solid material, and evaporated to remove the solvent. The residue is dissolved in chloroform, washed with water, dried over anhydrous sodium sulfate, evaporated to remove chloroform and recrystallized from acetone to obtain 680 mg. gitoxin-3''',4'''-cyclocarbonate, M.P. 236–239° C. (decomp.).

EXAMPLE 24

Following the procedure described in Example 23, digitoxin - 4''' - monomethoxyformate and digoxin-4'''-monoethoxyformate is treated with sodium carbonate in acetone to obtain digitoxin - 3''',4''' - cyclocarbonate, M.P. 240–243° C. (decomp.) and digoxin-3''',4'''-cyclocarbonate, M.P. 268–270° C. (decomp.).

EXAMPLE 25

A solution of 10 mg. gitoxin-4'''-monomethoxyformate in 10 ml. pyridine is refluxed during 2 hours. The mixture showed a single spot on the thin-layer chromatogram corresponding to that of gitoxin-3''',4'''-cyclocarbonate.

EXAMPLE 26

A solution of 100 mg. gitoxin-4'''-monomethoxyformate is applied on a thin-layer of silica gel and after 2 days, the plate is developed to show a spot of 50 mg. gitoxin-3''',4'''-cyclocarbonate.

EXAMPLE 27

A solution of 30 mg. gitoxin-4'''-ethoxyformate in 3 ml. acetone is added with 10 mg. anhydrous potassium carbonate and refluxed for 2 hours. The mixture is filtered to remove solid material and the filtrate is evaporated to obtain 27 mg. residue. Purification of the residue by thin-layer chromatography affords 18 mg. gitoxin-3''',4'''-cyclocarbonate, M.P. 238–240° C. (decomp.).

EXAMPLE 28

A solution of 10 mg. gitoxin-16,4'''-diethoxyformate in 1 ml. acetone and 1 drop of glacial acetic acid is refluxed for 2 hours. The mixture is evaporated and chromatographed over thin-layer of silica gel to give spot of 16-O-ethoxyformylgitoxin-3''',4'''-cyclocarbonate.

EXAMPLE 29

A refluxed solution of 10 mg. gitoxin-4'''-monoethoxyformate in 1 ml. pyridine and 1 drop of glacial acetic acid showed spot of gitoxin-3''',4'''-cyclic carbonate on a thin-layer chromatogram.

EXAMPLE 30

A solution of 100 mg. gitoxin-4'''-monoethoxyformate is applied on a thin-layer of alumina and developed after 2 days. The main fraction gives 30 mg. gitoxin-3''',4'''-cyclocarbonate, M.P. 240–242° C. (decomp.).

EXAMPLE 31

A solution of gitoxin-4'''-ethoxyformate (40 mg.) in methanol containing 1% potassium hydrogen carbonate is kept at room temperature for 2 days. The mixture is diluted with water and extracted with chloroform. The extract is recrystallized from acetone to give 24 mg. gitoxin-3''',4'''-cyclocarbonate, M.P. 240–242° C. (decomp).

What we claim is:

1. A mono- or poly-carbonate of a compound of the formula wherein R represents a hydrogen atom or $OR_5$; R' represents a hydrogen atom or $OR_6$; $R_1$, $R_2$, $R_3$, $R_4$, $R_5$ and $R_6$ each represents a hydrogen atom or a lower acyl group selected from the group consisting of hydrocarbon carbonyl containing up to 10 carbon atoms, monocyclic aromatic sulfonyl containing up to 8 carbon atoms which can be substituted by a nitro group or halogen, alkyl sulfonyl containing up to 8 carbon atoms, alkyl phosphoryl containing up to 8 carbon atoms and inorganic phosphoryl and surfuryl groups, in which at least one of $R_{1-6}$ is an acylable hydrogen atom, wherein said carbonate group or groups contain from 1 to 9 carbon atoms and, when containing more than one carbon atom, are selected from the group consisting of alkyl- and alkenyl-oxyformates and aryloxy and aralkyloxy-formates, and when containing only one carbon atom can be cyclic carbonate linking two carbons in the same cyclic moiety.

2. A compound claimed in claim 1, wherein $R_1$ and $R_2$ are hydrogen atoms.

3. A compound claimed in claim 2, namely digitoxin-3''',4'''-cyclocarbonate.

4. A compound claimed in claim 2, namely gitoxin-3''',4'''-cyclocarbonate.

5. A compound claimed in claim 2, namely digoxin-3''',4'''-cyclocarbonate.

6. A compound claimed in claim 2, namely diginatin-3''',4'''-cyclocarbonate.

7. A compound claimed in claim 1, namely 16-O-alkoxyformylgitoxin-3''',4'''-cyclocarbonate.

8. A compound claimed in claim 7, namely 16-O-methoxyformylgitoxin-3''',4'''-cyclocarbonate.

9. A compound claimed in claim 7, namely 16-O-ethoxyformylgitoxin-3''',4'''-cyclocarbonate.

10. A compound claimed in claim 1, namely 16-O-acylgitoxin-3''',4'''-cyclocarbonate.

11. A compound claimed in claim 10, namely 16-O-formylgitoxin - 3''',4'''-cyclocarbonate (gitaloxin-3''',4'''-cyclocarbonate).

12. A compound claimed in claim 10, namely 16-O-acetylgitoxin-3''',4'''-cyclocarbonate.

13. A compound claimed in claim 10, namely 16-O-propionylgitoxin-3''',4'''-cyclocarbonate.

14. A compound claimed in claim 10, namely 16-O-aromatic-acylgitoxin-3''',4'''-cyclocarbonate.

15. A compound claimed in claim 14, namely 16-O-benzoylgitoxin-3''',4'''-cyclocarbonate.

16. A compound claimed in claim 10, namely 16-O-(alkoxy or hydroxy)carbonylalkanoylgitoxin - 3''',4'''-cyclocarbonate.

17. A compound claimed in claim 16, namely 16-O-hemisuccinylgitoxin-3''',4'''-cyclocarbonate.

18. A compound claimed in claim 10, namely 16-O-hydrocarbonsulfonylgitoxin-3''',4'''-cyclocarbonate.

19. A compound claimed in claim 18, namely 16-O-p-toluenesulfonylgitoxin-3''',4'''-cyclocarbonate.

20. A compound claimed in claim 1, namely 12-O-alkoxyformyldigoxin-3''',4'''-cyclocarbonate.

21. A compound as claimed in claim 1, namely 12-O-acyldigoxin-3''',4'''-cyclocarbonate, the acyl being selected from the group consiting of lower alkanoyl, benzoyl and toluene-p-sulfonyl.

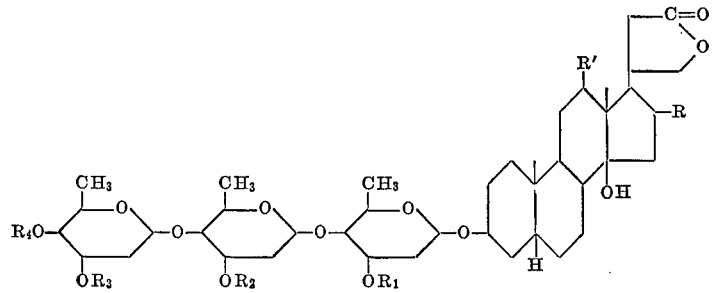

22. A compound claimed in claim 1, namely a compound of the formula:

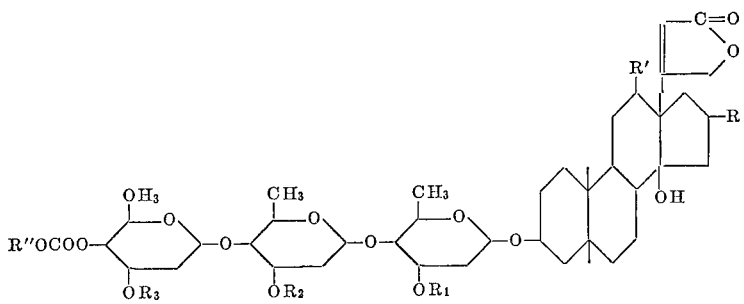

wherein R represents a hydrogen atom or $OR_5$; R' represents a hydrogen atom or $OR_6$; $R_1$, $R_2$, $R_3$, $R_5$ and $R_6$ each represents a hydrogen atom or an acyl group; R" represents a hydrocarbon group.

23. A compound claimed in claim 22, wherein R and R' are hydrogen atoms.

24. A compound claimed in claim 23, namely digitoxin-4'''-alkoxyformate.

25. A compound claimed in claim 23, namely digitoxin-3''',4'''-diethoxyformate.

26. A compound claim in claim 23, namely digitoxin-3' or 3'', 3''',4'''-triethoxyformate.

27. A compound claimed in claim 22, wherein R is $OR_5$; R' is a hydrogen atom.

28. A compound claimed in claim 27, namely gitoxin-4'''-alkoxyformate.

29. A compound claimed in claim 28, namely gitoxin-4'''-methoxyformate.

30. A compound claimed in claim 28, namely gitoxin-4'''-ethoxyformate.

31. A compound claimed in claim 27, namely gitoxin-4''',16-dialkoxyformate.

32. A compound claimed in claim 27, namely gitoxin-trialkoxyformate.

33. A compound claimed in claim 27, namely gitoxin-tetraethoxyformate.

34. A compound claimed in claim 22, wherein R is a hydrogen atom; R' is $OR_6$.

35. A compound claimed in claim 34, namely digoxin-4'''-alkoxyformate.

36. A compound claimed in claim 34, namely digoxin-dialkoxyformate.

37. A compound claimed in claim 1, namely gitoxin-16-alkoxyformate.

38. A compound claimed in claim 37, namely gitoxin-16-methoxyformate.

39. A compound claimed in claim 37, namely gitoxin-12-ethoxyformate.

40. A compound claimed in claim 1, namely digoxin-12-methoxyformate.

41. A process for preparing a compound claimed in claim 1, which comprises reacting a compound of the partial formula:

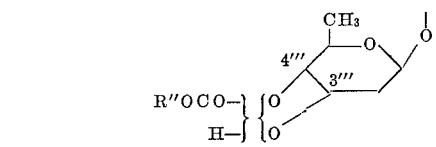

wherein R" represents a hydrocarbon group, with an acid or a base to obtain the corresponding cyclic carbonate.

42. A process claimed in claim 41, wherein the reaction is carried out in the presence of an inert solvent.

43. A process claimed in claim 41, wherein the base is an alkali metal carbonate.

44. A process claimed in claim 41, when the reaction is carried out in an anhydrous medium.

45. A process claimed in claim 41, wherein the reaction is carried out at a temperature of range between —15° C. and refluxing temperature of the solvent used.

References Cited

UNITED STATES PATENTS

| | | | |
|---|---|---|---|
| 2,395,337 | 2/1946 | Marker et al. | 260—210.5 |
| 3,184,383 | 5/1965 | Hupin | 260—210.5 |
| 3,275,661 | 9/1966 | Widmer et al. | 260—234 |
| 3,332,428 | 7/1967 | Mold et al. | 260—234 |
| 3,432,486 | 3/1969 | Minato | 260—210.5 |

LEWIS GOTTS, Primary Examiner

J. R. BROWN, Assistant Examiner

U.S. Cl. X.R.

424—182